United States Patent
Fogg

(10) Patent No.: US 9,660,516 B2
(45) Date of Patent: May 23, 2017

(54) SWITCHING CONTROLLER WITH REDUCED INDUCTOR PEAK-TO-PEAK RIPPLE CURRENT VARIATION

(71) Applicant: Monolithic Power Systems, Inc., San Jose, CA (US)

(72) Inventor: John Fogg, Cary, NC (US)

(73) Assignee: Monolithic Power Systems, Inc., San Jose, CA (US)

( * ) Notice: Subject to any disclaimer, the term of this patent is extended or adjusted under 35 U.S.C. 154(b) by 189 days.

(21) Appl. No.: 14/566,598

(22) Filed: Dec. 10, 2014

(65) Prior Publication Data

US 2016/0172999 A1    Jun. 16, 2016

(51) Int. Cl.
*H02M 1/32* (2007.01)
*H02M 3/158* (2006.01)

(52) U.S. Cl.
CPC ........... *H02M 1/32* (2013.01); *H02M 3/1588* (2013.01); *Y02B 70/1466* (2013.01)

(58) Field of Classification Search
CPC .. H02M 1/32; H02M 2001/325; H02M 7/537; G05F 1/565; G05F 1/569; G05F 1/571; G05F 1/573; G01R 19/165; G01R 19/16571; G01R 19/16576; G01R 19/1659
USPC ............... 323/271, 276, 277, 282, 284, 285; 363/50, 51, 52, 53, 56.1, 56.11; 324/500; 361/88, 89, 91.1, 91.3, 93.1, 94, 97, 98
See application file for complete search history.

(56) References Cited

U.S. PATENT DOCUMENTS

| | | | | |
|---|---|---|---|---|
| 4,980,576 A | * | 12/1990 | Rossi | H02M 3/156 327/109 |
| 5,694,283 A | * | 12/1997 | Huczko | H02H 9/008 361/93.9 |
| 7,928,713 B2 | | 4/2011 | Nguyen | |
| 8,891,258 B2 | | 11/2014 | Zhang et al. | |
| 2012/0049826 A1 | * | 3/2012 | Hsu | H02M 3/1588 323/284 |
| 2013/0300400 A1 | | 11/2013 | Zhou | |
| 2014/0253079 A1 | * | 9/2014 | Ding | H02M 3/156 323/283 |
| 2016/0028311 A1 | * | 1/2016 | Murakami | H02M 3/156 323/271 |

* cited by examiner

*Primary Examiner* — Jue Zhang
*Assistant Examiner* — Jye-June Lee
(74) *Attorney, Agent, or Firm* — Perkins Coie LLP

(57) ABSTRACT

A switching controller having an over voltage protection circuit is disclosed. The over voltage protection circuit detects whether the output voltage is higher than an over voltage threshold and turns on the rectifier when the output voltage is higher than an over voltage threshold. The over voltage protection circuit detects whether a current flowing through a rectifier is lower than a negative current limit and further turns off the rectifier for a time period when the current flowing through the rectifier is lower than the negative current limit. The off time period varies inversely with the input voltage.

20 Claims, 10 Drawing Sheets

SWITCHING CONTROLLER WITH REDUCED INDUCTOR PEAK-TO-PEAK RIPPLE CURRENT VARIATION

TECHNICAL FIELD

The present invention relates generally to electronic circuits, and more particularly but not exclusively to switching controllers with over voltage protection and switching converters and methods thereof.

BACKGROUND

"Dynamic Regulation Mode" is widely used in switching converters to prevent damage to a load due to an over output voltage which exceeds a defined threshold. In dynamic regulation mode, a rectifier in the switching converter is turned on to lower the output voltage. Thus, an inductor current flowing through the rectifier decreases gradually in a positive direction at first, and then further decreases in a negative direction until a negative current limit of the rectifier is reached, at which moment, the rectifier is turned off for a fixed time period. Afterwards, a new cycle repeats.

As the off time of the rectifier is fixed, and the slope of the inductor current varies as a function of the difference between an input voltage applied to the switching converter and the output voltage during this off time, a large variation in the output current of the switching converter occurs when there is a variation in the input voltage or the output voltage.

SUMMARY

Embodiments of the present invention are directed to a controller for controlling a switching circuit. The switching circuit has a rectifier, and the switching circuit is configured to provide an output voltage based on an input voltage. The controller has an over voltage protection circuit and a control circuit. The over voltage protection circuit has an over voltage detection circuit configured to compare a feedback signal representative of the output voltage with an over voltage threshold and to generate an over voltage detection signal based on the comparison result; an over current detection circuit configured to compare a current sense signal representative of a current flowing through the rectifier with an over current threshold and to generate an over current detection signal based on the comparison result; and a timing circuit configured to generate a timing signal based on the over voltage detection signal and the over current detection signal. The timing signal is configured to control an off time of the rectifier so that the off time varies inversely with the input voltage. The control circuit is electrically coupled to the over voltage protection circuit and the switching circuit. Based on the over current detection signal, the timing signal and the feedback signal, the control circuit generates a control signal to control the rectifier.

Embodiments of the present invention are also directed to a switching converter. The switching converter has a switching circuit and a controller. The switching circuit has a rectifier and the switching circuit is configured to provide an output voltage based on an input voltage. The controller has an over voltage detection circuit configured to compare a feedback signal representative of the output voltage with an over voltage threshold and to generate an over voltage detection signal based on the comparison result; an over current detection circuit configured to compare a current sense signal representative of a current flowing through the rectifier with an over current threshold and to generate an over current detection signal based on the comparison result; a timing circuit configured to generate a timing signal based on the over voltage detection signal and the over current detection signal; and a control circuit electrically coupled to the over voltage protection circuit and the switching circuit. Based on the over current detection signal, the timing signal and the feedback signal, the control circuit generates a control signal to control the rectifier. The timing signal is configured to control an off time of the rectifier so that the off time varies inversely with the input voltage.

Embodiments of the present invention are further directed to an over voltage protection method for a switching converter having a rectifier. The switching converter is configured to provide an output voltage based on an input voltage. The over voltage protection method detects whether the output voltage is higher than a predetermined value and turns on the rectifier when the output voltage is higher than the predetermined value. The over voltage protection method detects whether a current flowing through the rectifier is lower than a negative current limit and turns off the rectifier for a time period when the current flowing through the rectifier is lower than the negative current limit. The off time period varies inversely with the input voltage.

BRIEF DESCRIPTION OF THE DRAWINGS

The present invention can be further understood with reference to the following detailed description and the appended drawings, wherein like elements are provided with like reference numerals.

Figure 3:
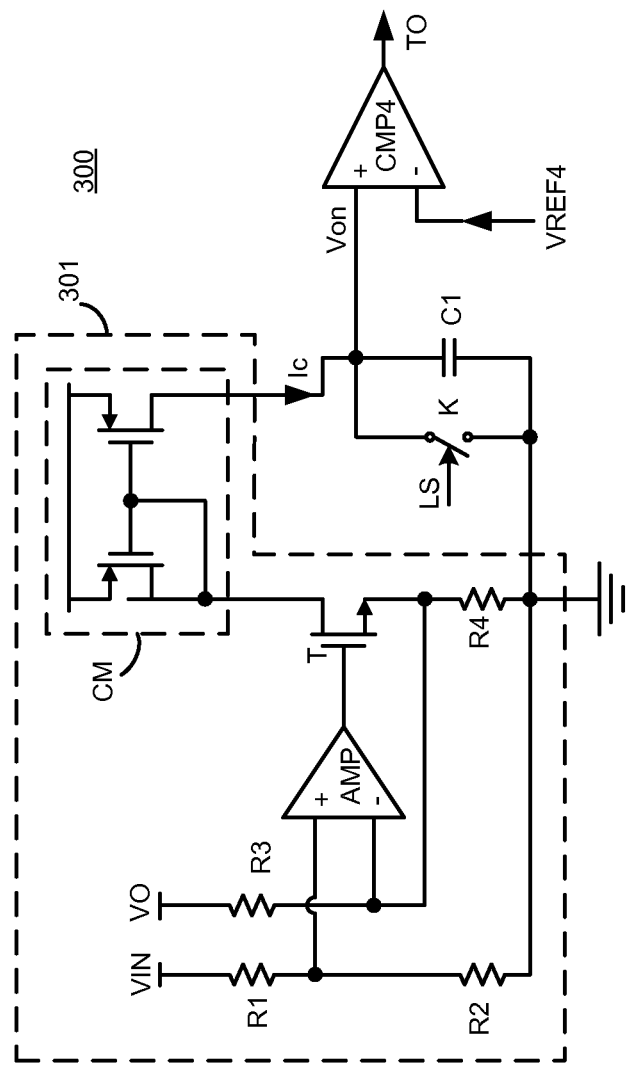
FIG. 3 illustrates a timing circuit 300 which determines $$t_{\mathit{off}} = \frac{k1}{VIN - VO}$$
Figure 4:
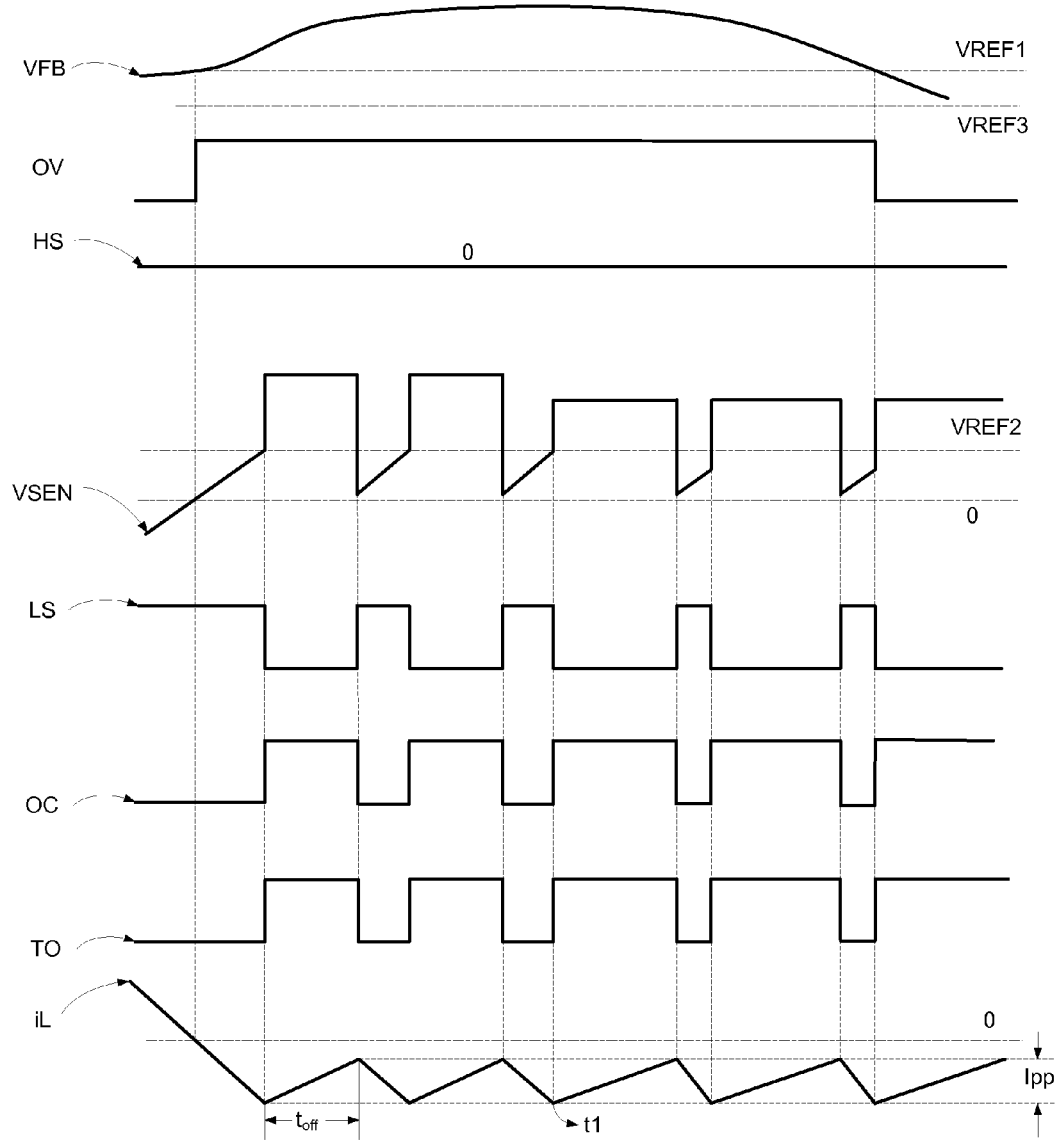
Figure 5:
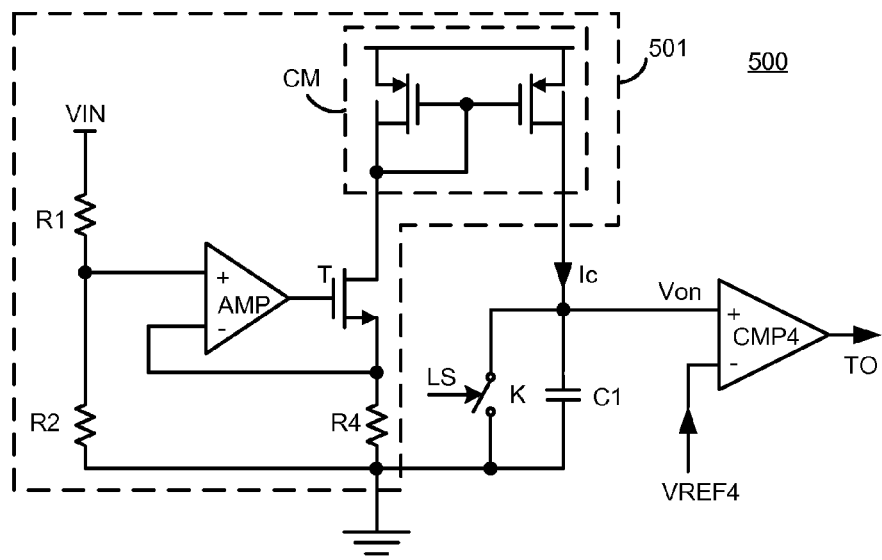
Figure 6:
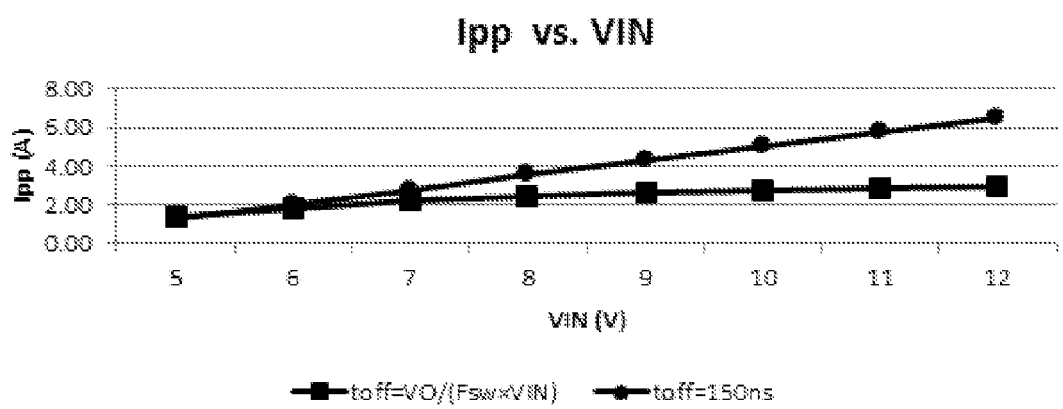
Figure 7:
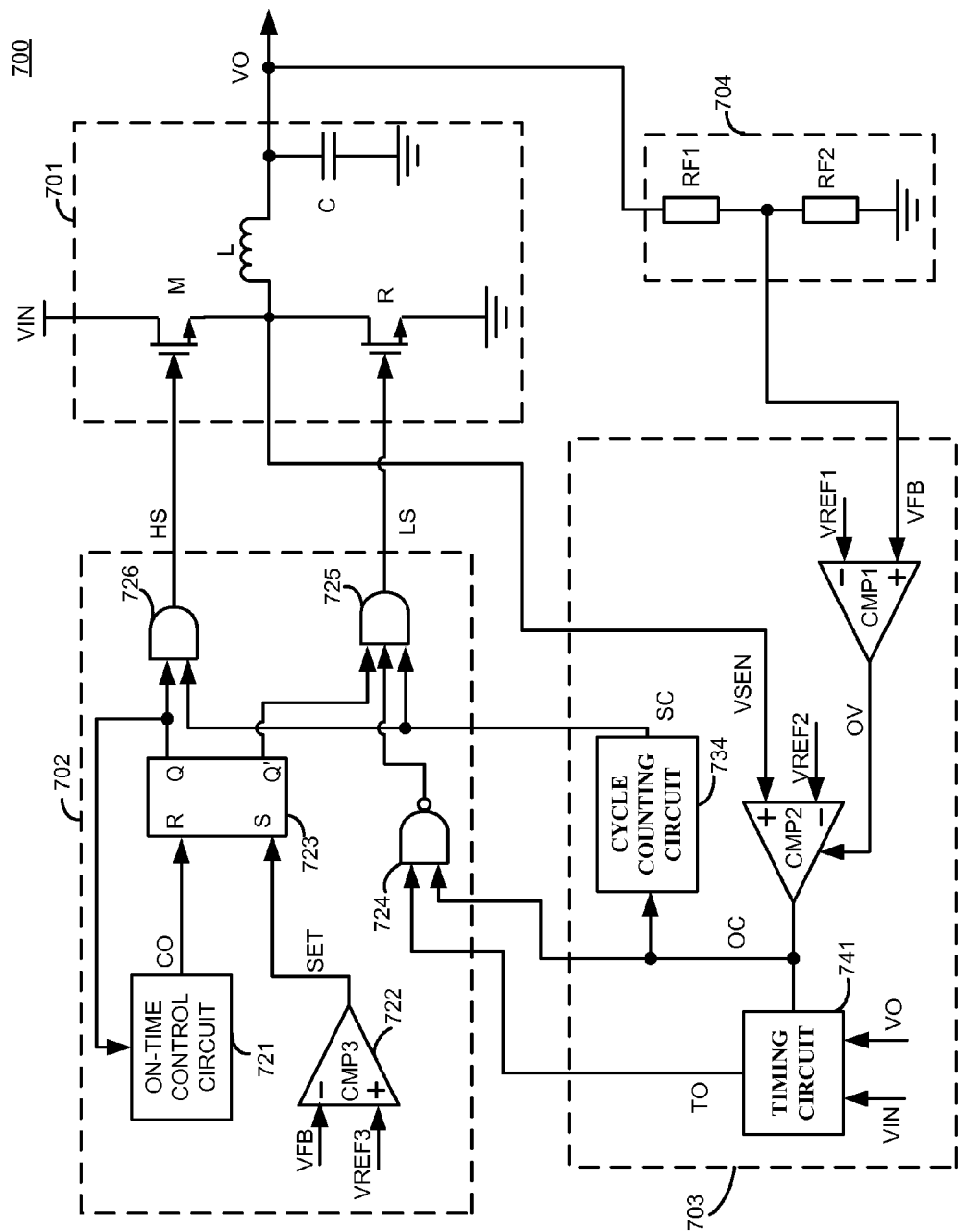
Figure 8:
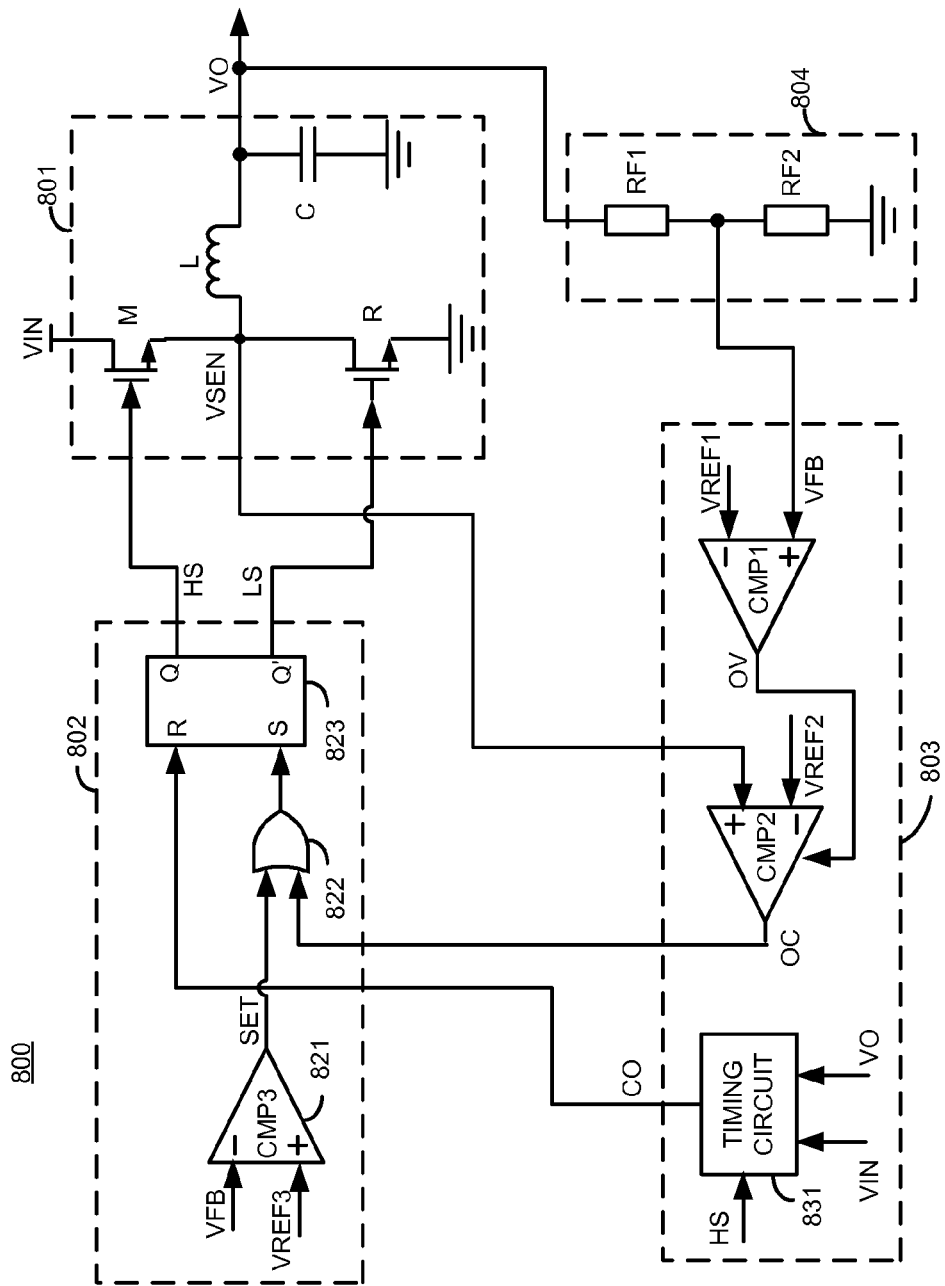
Figure 9:
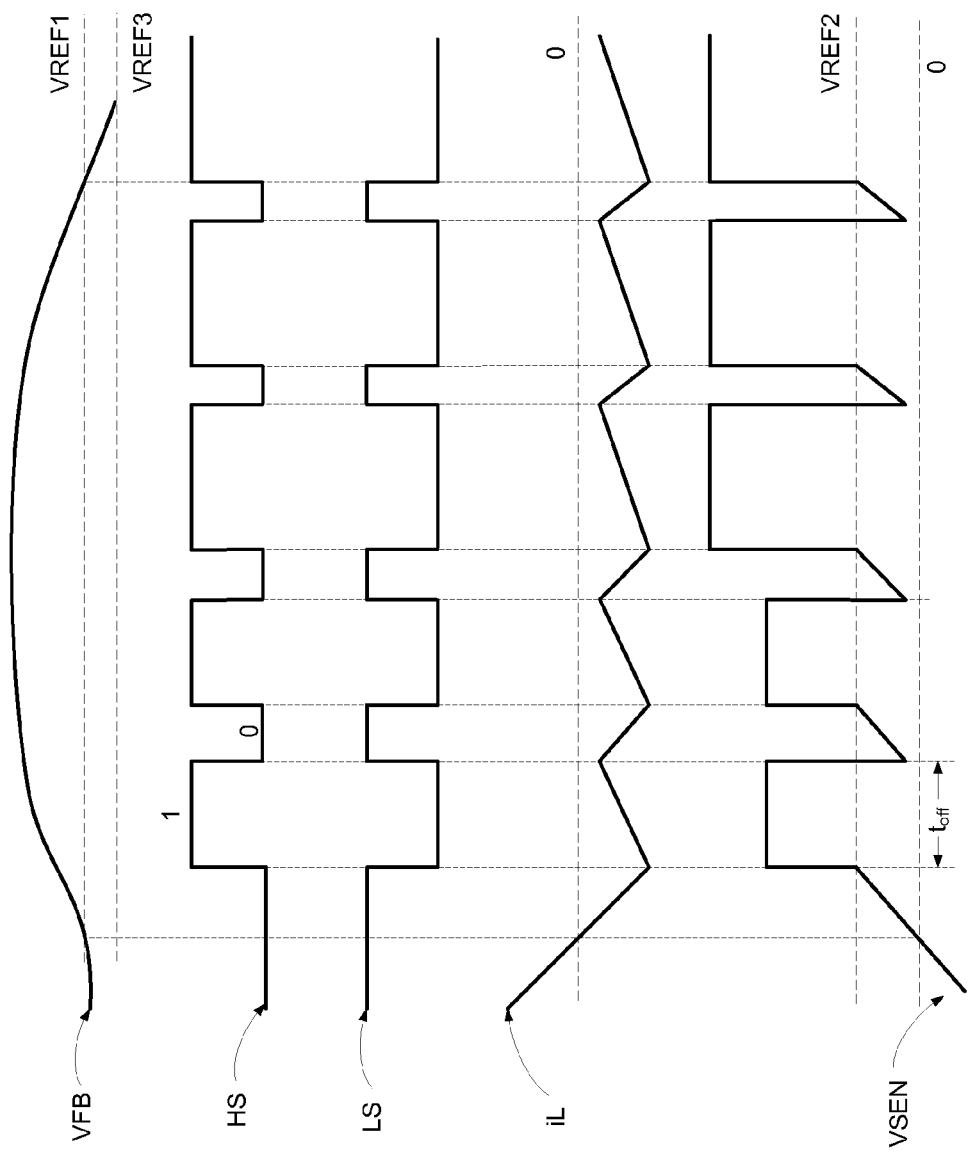
Figure 10:
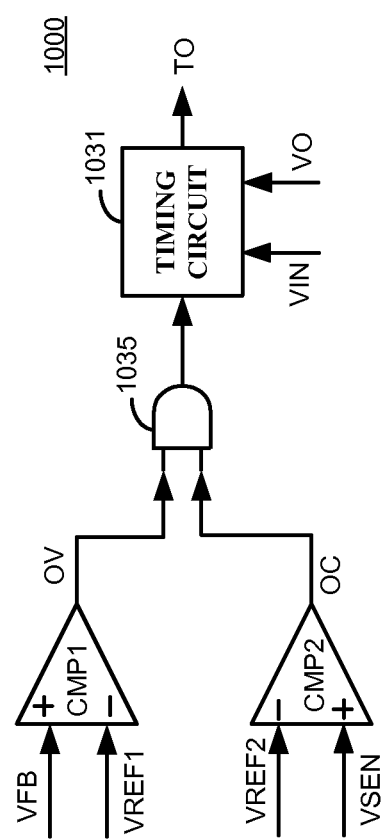
Figure 11:
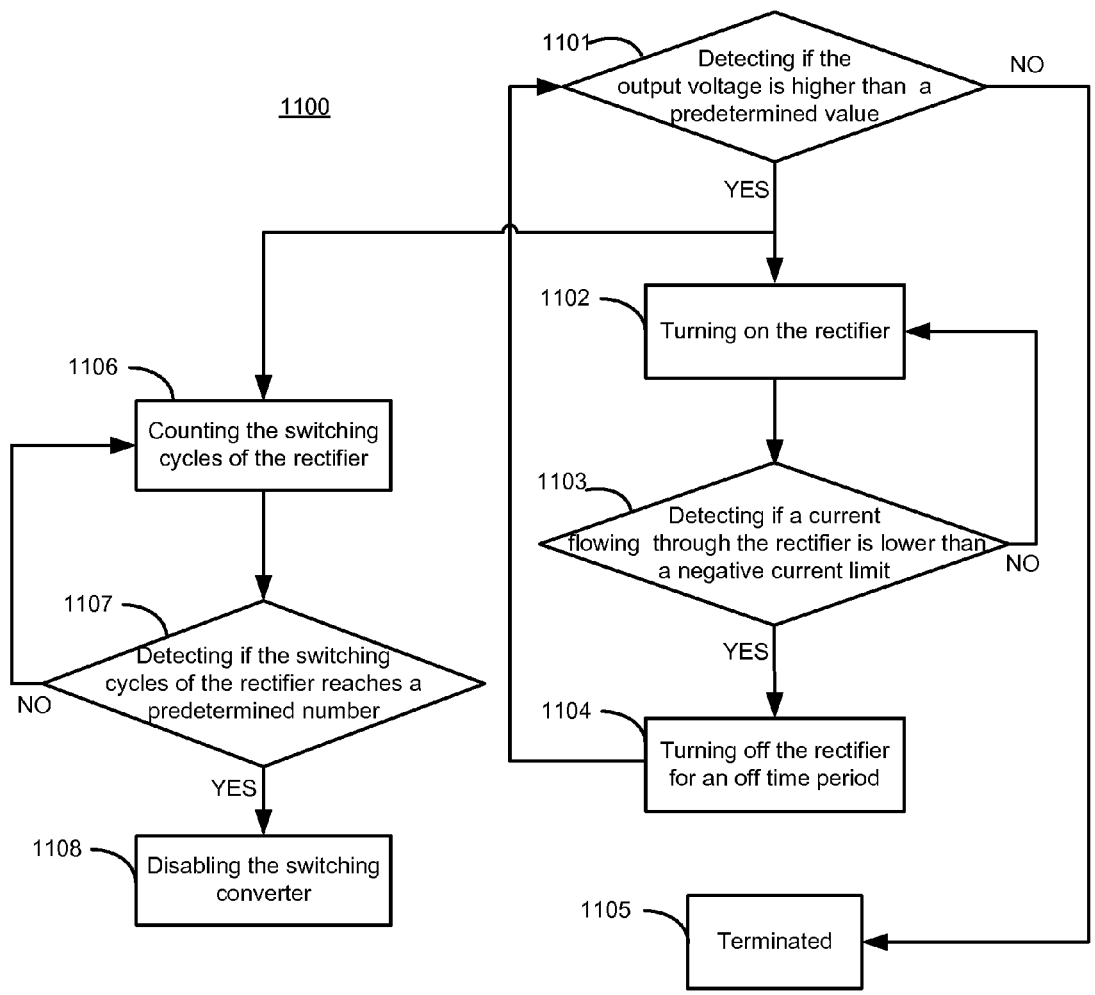

according to an embodiment of the present invention;

FIG. 4 illustrates the waveforms of the switching converter 200 implemented with the timing circuit 300 shown in FIG. 3;

FIG. 5 illustrates a timing circuit 500 which determines $$t_{\mathit{off}} = \frac{k2}{VIN}$$

according to another embodiment of the present invention;

FIG. 6 illustrates the waveforms of the switching converter 500 shown in FIG. 5;

FIG. 7 schematically illustrates a switching converter 700 in accordance with another embodiment of the present invention;

FIG. 8 schematically illustrates a switching converter 800 in accordance with another embodiment of the present invention;

FIG. 9 illustrates the waveforms of the switching converter 800 shown in FIG. 8;

FIG. 10 schematically illustrates an over voltage protection circuit 1000 in accordance with another embodiment of the present invention;

FIG. 11 illustrates an over voltage protection method 1100 for a switching converter in accordance with an embodiment of the present invention.

DETAILED DESCRIPTION

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references.

Figure 1:
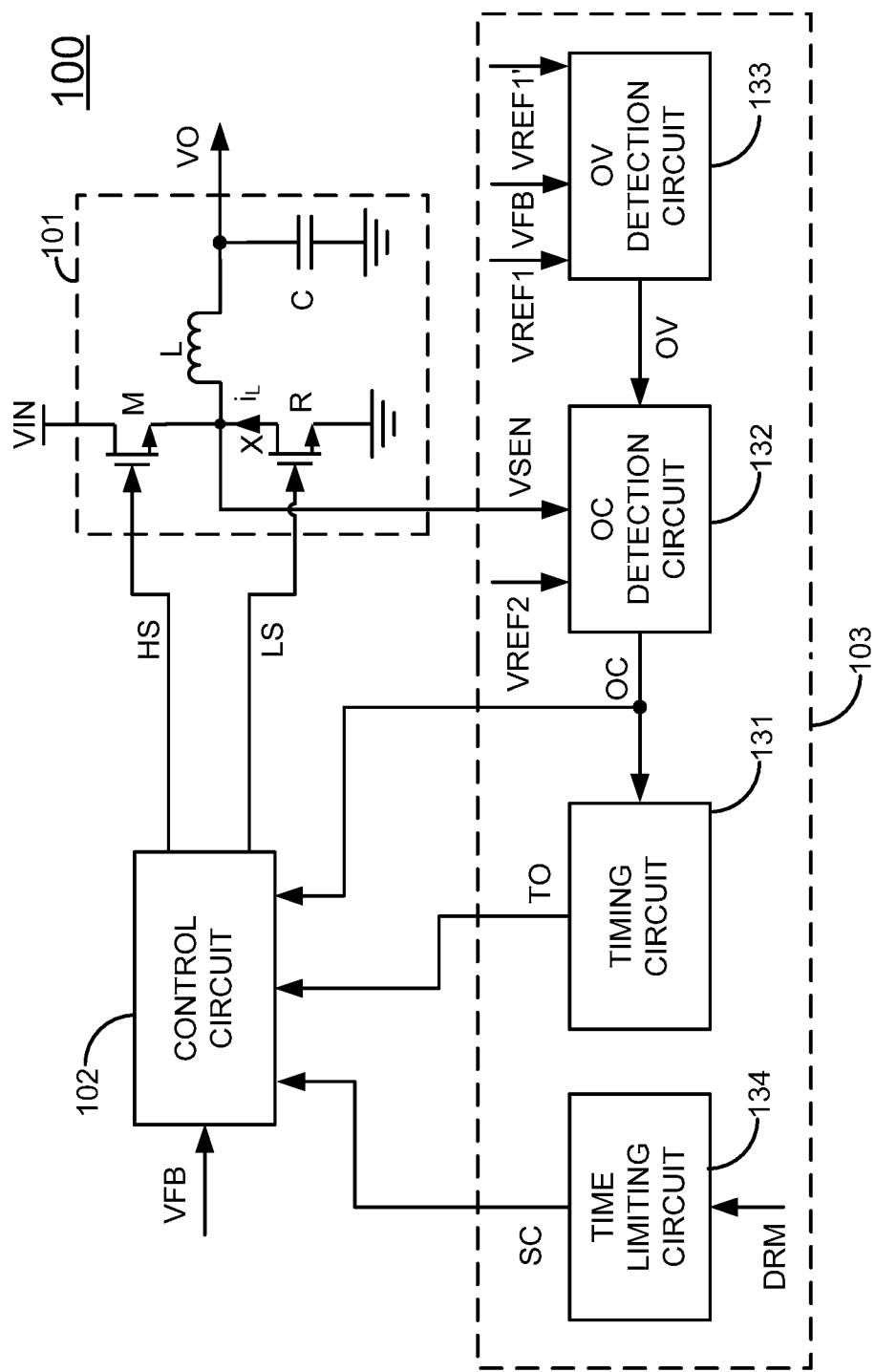
FIG. 1 illustrates a block diagram of a switching converter 100 in accordance with an embodiment of the present invention.

FIG. 1 illustrates a block diagram of a switching converter 100 in accordance with an embodiment of the present invention. As shown in FIG. 1, the switching converter 100 comprises a switching circuit 101 and a controller. The controller comprises a control circuit 102 and an over voltage protection circuit 103.

The switching circuit 101 is configured to receive an input voltage VIN at an input terminal and to further convert the input voltage VIN into a regulated output voltage VO at an output terminal. The switching circuit 101 is implemented with a synchronous buck topology and comprises a main switch M, a synchronous rectifier R, an inductor L and an output capacitor C. The main switch M has a first terminal, a second terminal and a control terminal, wherein the first terminal is configured to receive the input voltage VIN. The rectifier R has a first terminal, a second terminal and a control terminal, wherein the first terminal is electrically coupled to the second terminal of the main switch M and forms a switching node together therewith, and the second terminal is electrically coupled to a reference ground. The inductor L has a first terminal and a second terminal, wherein the first terminal is electrically coupled to the switching node. The output capacitor C is electrically coupled between the second terminal of the inductor L and the reference ground, providing a voltage drop thereacross as the output voltage VO of the switching circuit 101.

Persons of ordinary skill in the art will recognize that the components of the switching circuit 101 illustrated in the embodiment of FIG. 1 may be interconnected in any desired manner and the switching circuit 101 may be implemented with a variety of switching topologies where there is a desire for regulating an over output voltage.

The over voltage protection circuit 103 comprises an over voltage detection circuit 133, an over current detection circuit 132 and a timing circuit 131. The over voltage detection circuit 133 is configured to receive a feedback signal VFB representative of the output voltage VO and an over voltage threshold VREF1. The over voltage detection circuit 133 compares the feedback signal VFB with the over voltage threshold VREF1 and generates an over voltage detection signal OV based on the comparison result.

In some embodiments, hysteresis is used to detect the entry and the exit of the dynamic regulation mode. In such embodiments, the over voltage detection circuit 133 is further configured to receive an exit reference voltage VREF1' (the over voltage threshold VREF1 is referred to as an entry reference voltage herein). The over voltage detection circuit 133 compares both the entry reference voltage VREF1 and the exit reference voltage VREF1' with the feedback signal VFB and generates the over voltage detection signal OV based on the comparison result. In detail, the over voltage detection signal OV transits from a first state to a second state and the switching converter 100 enters the dynamic regulation mode when the feedback signal VFB is higher than the entry reference voltage VREF1. Further, the over voltage detection signal OV transits from the second state to the first state and the switching converter 100 exits the dynamic regulation mode when the feedback signal VFB is lower than the exit reference voltage VREF1'. In one embodiment, the exit reference voltage VREF1' may be lower than the entry reference voltage VREF1.

The over current detection circuit 132 is electrically coupled to the switching circuit 101 to receive a current sense signal VSEN representative of an inductor current $i_L$ flowing through the inductor. The over current detection circuit 132 is further configured to receive an over current threshold VREF2. The over current detection circuit 132 compares the current sense signal VSEN with the over current threshold VREF2 and generates an over current detection signal OC based on the comparison result.

Persons of ordinary skill in the art will recognize that, in the embodiment of FIG. 1, the over current detection circuit 132 detects the inductor current $i_L$ flowing through the rectifier R by sensing the voltage drop across the on-resistor of the rectifier R when it is turned on. However, it should be known that the detection may be achieved by sensing the voltage across any resistor that is connected serially with the rectifier R in the circuit loop consisting of the inductor L, the output capacitor C and the rectifier R.

In the embodiment of FIG. 1, the over current detection circuit 132 is electrically coupled to the over voltage detection circuit 133 to receive the over voltage detection signal OV. The timing circuit 131 is electrically coupled to the over current detection circuit 132 to receive the over current detection signal OC. Based on the over current detection signal OC, the timing circuit 131 is configured to generate a timing signal TO to control an off time $t_{off}$ of the rectifier R so that the off time $t_{off}$ varies inversely with the input voltage VIN. That is, the off time $t_{off}$ increases with decreasing input voltage VIN and decreases with increasing input voltage VIN, and vice versa.

Persons of ordinary skill in the art will recognize that the interconnection of the timing circuit 131, the over voltage detection circuit 133 and the over current detection circuit 132 shown in FIG. 1 is illustrative. The above mentioned circuits may be interconnected in any desired manner provided that, based on the over current detection signal OC and the over voltage detection signal OV, the timing circuit 131 generates the timing signal TO being capable of controlling the off time $t_{off}$ of the rectifier R so that the off time $t_{off}$ varies inversely with the input voltage VIN. This will soon become apparent with the illustrated embodiments of FIG. 2 and FIG. 10.

The control circuit 102 is electrically coupled to the switching circuit 101 and the over voltage protection circuit 103 to respectively receive the feedback signal VFB, the over current detection signal OC and the timing signal TO. Based on the feedback signal VFB, the over current detection signal OC and the timing signal TO, the control circuit 102 generates a first control signal HS and a second control signal LS to respectively control the switching action of the main switch M and the rectifier R.

In normal operation, the control circuit 102 is configured to provide control signals HS and LS to respectively control the switching actions of the main switch and the rectifier R in response to the feedback signal VFB so that the switching circuit 101 provides a stable output voltage. The control circuit 102 may be implemented by any suitable control technique, such as PWM (Pulse Width Modulation), PFM (Pulse Frequency Modulation), or PWM-PFM etc. In more detail, the control circuit 102 may employ COT (Constant-On-Time) control, peak current mode control or the like.

In operation, when the output voltage VO is pulled up above an over output voltage, the switching converter 100 enters into "dynamic regulation mode" and the over voltage detection signal OV transits from the first state to the second state indicative of the dynamic regulation mode. In dynamic regulation mode, the rectifier R is turned on to discharge the output voltage VO and the inductor current $i_L$ decreases gradually. Initially, the inductor current $i_L$ flows into the output capacitor C through the rectifier R in a positive direction shown by an arrow X in FIG. 1. When it decreases to zero, the inductor current $i_L$ reverses and begins to flow away from the output capacitor C in a negative direction opposite to the direction of the arrow X, and down through the rectifier R to the reference ground. The over current detection circuit 132 compares the current sense signal VSEN indicative of the inductor current $i_L$ flowing through the rectifier R with the over current threshold VREF2. If the inductor current $i_L$ decreases to an extent that the current sense signal VSEN reaches the over current threshold VREF2, the over current detection signal OC transits from a first state to a second state to turn off the rectifier R and to initiate the timing circuit 131. When the rectifier R is off, the inductor current $i_L$ flows from the output terminal of the switching circuit 101 to the input terminal of the switching circuit 101 through the main switch M and increases gradually. When the timing circuit 131 times out after the off time period $t_{off}$, the timing signal TO transits from a first state to a second state to turn on the rectifier R through the control circuit 102 again and the rectifier R keeps on until the over current threshold VREF2 is reached again. Afterwards, new cycles repeat again and again until the output voltage VO decreases below the over output voltage. In this way, the switching converter 100 goes back into normal regulation where the switching circuit 101 is no longer controlled by the over voltage protection circuit 103.

In the switching converter 100, the peak-to-peak ripple current value Ipp of the inductor current $i_L$ is calculated as follows:

$$Ipp = \frac{VIN - VO}{L} \times t_{off} \quad (1)$$

Wherein $$\frac{VIN - VO}{L}$$

represents the rising slope of the inductor current $i_L$ when the rectifier R is off, which obviously varies along with the input voltage VIN.

In the present invention, as the off time period $t_{off}$ of the rectifier R varies inversely with the input voltage VIN, the variation of the peak-to-peak ripple current value Ipp is thus reduced compared with that of the traditional approach with a fixed off time period. For example, when the input voltage VIN increases, the rising slope $$\frac{VIN - VO}{L}$$

increases too. However, the off time period $t_{off}$ of the rectifier R decreases according to the present invention. Thus, compared with the approach with the fixed off time period, the peak-to-peak ripple current value Ipp varies less with the variation of the input voltage VIN in the present invention. Thus, with the new approach illustrated in the embodiment of FIG. 1, a more accurate negative over current is achieved.

Now referring to FIG. 1 again, the over voltage protection circuit 103 further comprises a time limiting circuit 134 which is configured to limit the time the switching converter 100 may stay in dynamic regulation mode. More particularly, the time limiting circuit 134 is configured to shut off the switching converter 100 at the end of a predetermined time period starting from the moment when the output voltage VO exceeds the over output voltage. As shown in FIG. 1, the time limiting circuit 134 is configured to receive an indication signal DRM indicative of the beginning of the dynamic regulation mode, such as the over voltage detection signal OV, the over current detection signal OC, the timing signal TO or the like. Based on the indication signal, the time limiting circuit 134 provides a time limiting signal SC to the control circuit 102. In operation, the time limiting circuit 134 starts timing when it is trigged by the indication signal DRM and times out at the end of the predetermined time period, causing the time limiting signal SC to transit from a first state to a second state to disable the switching converter 100. In this way, the amount of energy that can be transferred from the output voltage VO to the input voltage VIN is limited, and the switching converter 100 is prevented from damage, especially the damage which may occur in bench testing. This improvement results from the fact that the standard way to test negative over current is to pull up the output voltage of the switching converter with a bench power supply. The problem with this technique is that the switching converter transfers energy from the output voltage VO back into the input voltage VIN. And the bench power supply often lack of a sink current capability, which results in damage to the switching converter and the power supply.

Persons of ordinary skill in the art will recognize that, in one embodiment, the time limiting circuit 134 may comprise a cycle counting circuit, wherein the cycle counting circuit starts counting the switching cycles of the rectifier R when it is triggered by the indication signal DRM, and outputs the time limiting signal SC to shut off the switching converter 100 when the switching cycles reach a predetermined number. In another embodiment, the switching converter 100 may be shut off by stopping the switching actions of the main switch and the rectifier R.

Persons of ordinary skill in the art will recognize that in the embodiment illustrated in FIG. 1, the main switch M may be on or off when the rectifier R is off. In the embodiment with the main switch M on, although the inductor current $i_L$ increases, it still remains negative during the entire time when the main switch is on with a tighter control of the switching converter 100 and thus will not increase the output voltage VO.

Persons of ordinary skill in the art will also recognize that in one embodiment, the off time period $t_{off}$ of the rectifier R may further vary along with the output voltage VO so that the variation of the peak-to-peak ripple current value Ipp is reduced compared with that of the traditional approach with a fixed off time period as the output voltage VO varies. This results from the fact that, for example, when the output voltage VO increases, the rising slope $$\frac{VIN - VO}{L}$$

decreases, while the off time period $t_{off}$ of the rectifier R increases according to the present invention. Thus, compared with the approach with the fixed off time period, the peak-to-peak ripple current value Ipp varies less with the variation of the output voltage VO in the present invention.

Figure 2:
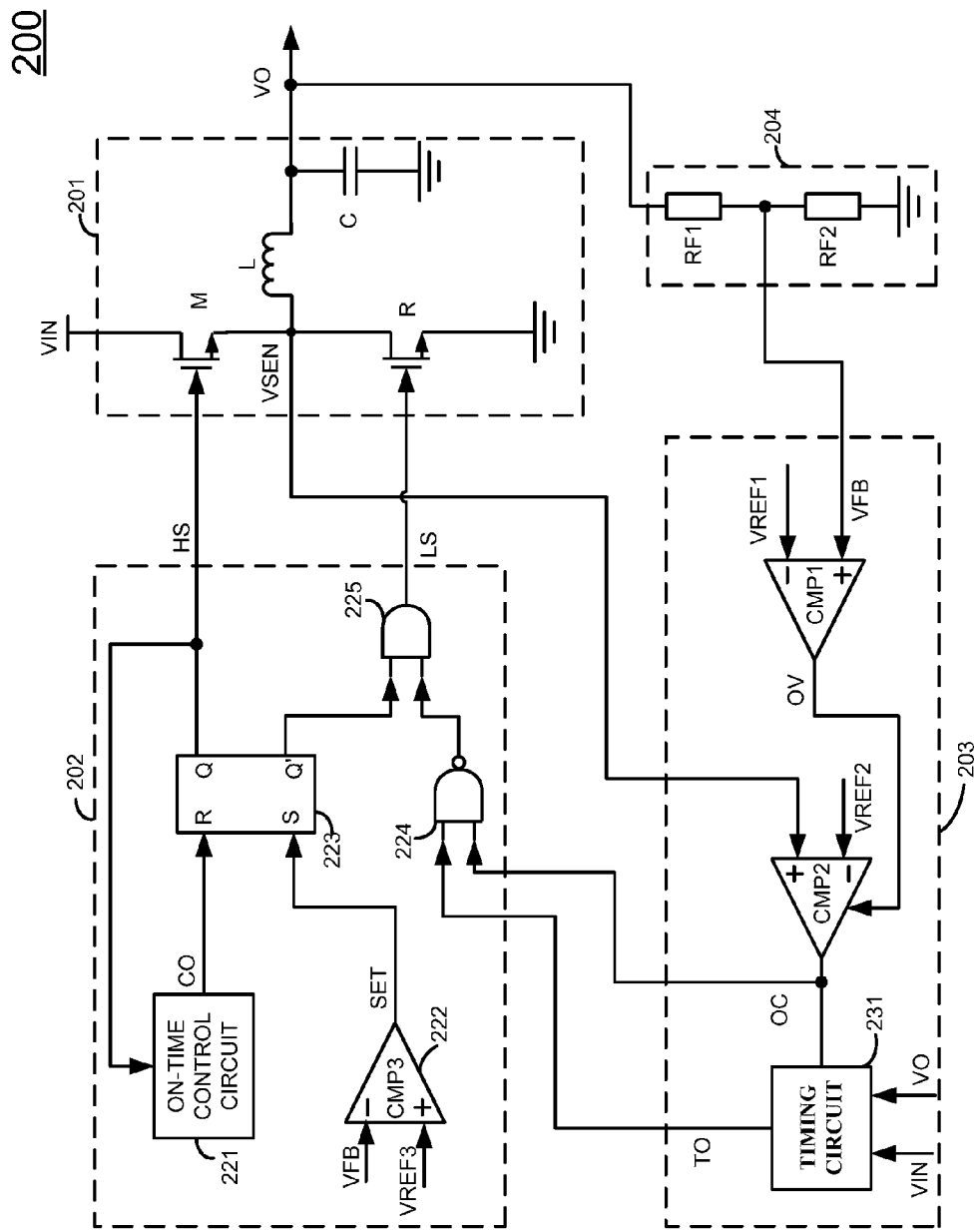
FIG. 2 schematically illustrates a switching converter 200 in accordance with an embodiment of the present invention.

FIG. 2 schematically illustrates a switching converter 200 in accordance with an embodiment of the present invention. As shown in FIG. 2, the switching converter 200 comprises a switching circuit 201, a feedback circuit 204 and a controller. The controller comprises a control circuit 202 and an over voltage protection circuit 203.

The switching circuit 201 has a similar configuration as that of the switching circuit 101 illustrated in FIG. 1, and thus will not be described here for clarity purpose.

The feedback circuit 204 is electrically coupled to the switching circuit 201 to receive the output voltage VO and is configured to generate a feedback signal VFB based thereupon. In one embodiment, the feedback circuit 204 comprises a voltage divider consisting of resistors RF1 and RF2 which are connected in series. In another embodiment, the feedback circuit 204 may be omitted, and the output voltage VO is used as the feedback signal VFB.

The over voltage protection circuit 203 comprises an over voltage detection circuit CMP1, an over current detection circuit CMP2 and a timing circuit 231. The over voltage detection circuit CMP1 has a non-inverting input terminal, an inverting input terminal and an output terminal. The non-inverting input terminal is electrically coupled to the feedback circuit 204 to receive the feedback signal VFB, and the inverting input terminal is configured to receive an over voltage threshold VREF1. The comparator CMP1 compares the over voltage threshold VREF1 with the feedback signal VFB and generates an over voltage detection signal OV at the output terminal. The over current detection circuit CMP2 has a non-inverting input terminal, an inverting input terminal, an output terminal and an enable terminal. The non-inverting input terminal is electrically coupled to the switching node to receive a current sense signal VSEN which is a voltage drop across the rectifier R in the embodiment illustrated in FIG. 2, the inverting input terminal is configured to receive an over current threshold VREF2, and the enable terminal is electrically coupled to the output terminal of the over voltage detection circuit CMP1 to receive the over voltage detection signal OV. When the over current detection circuit CMP2 is enabled by the over voltage detection signal OV, it compares the current sense signal VSEN with the over current threshold VREF2 and generates an over current detection signal OC at the output terminal. The timing circuit 231 has a first input terminal and an output terminal. The first input terminal is configured to receive the over current detection signal OC. Based on the over current detection signal OC, the timing circuit 231 is configured to provide a timing signal TO at the output terminal to control an off time period $t_{off}$ of the rectifier R so that the off time period $t_{off}$ of the rectifier R varies inversely with the input voltage VIN.

The control circuit 202 employs COT control technique and comprises an on-time control circuit 221, a comparison circuit 222, a RS flip-flop 223, a NAND gate 224 and an AND gate 225. The on-time control circuit 221 is configured to provide an on-time control signal CO to control the on time of the main switch M and to partially control the off time of the rectifier R. In one embodiment, the on time of the main switch M is constant. In another embodiment, the on time of the main switch M varies with the input voltage VIN and/or the output voltage VO. The comparison circuit 222 is electrically coupled to the feedback circuit 204 to receive the feedback signal VFB. The comparison circuit 222 compares the feedback signal VFB with a reference voltage VREF3 and generates a comparison signal SET based on the comparison result. In one embodiment, the comparison circuit 222 comprises a comparator CMP3 having a non-inverting input terminal, an inverting input terminal and an output terminal. The non-inverting input terminal is configured to receive the reference voltage VREF3, the inverting input terminal is electrically coupled to the feedback circuit 204 to receive the feedback signal VFB. The comparator CMP3 compares the reference voltage VREF3 with the feedback signal VFB and generates the comparison signal SET at the output terminal. The RS flip-flop 223 has a set terminal S, a reset terminal R, a first output terminal Q and a second output terminal Q'. The set terminal S is electrically coupled to the comparison circuit 222 to receive the comparison signal SET, the reset terminal R is electrically coupled to the on-time control circuit 221 to receive the on-time control signal CO. Based on the comparison signal SET and the on-time control signal CO, the RS flip-flop 223 generates a first flip-flop signal at the first output terminal Q, which is provided to the control terminal of the main switch M as a first control signal HS of the control circuit 202. The RS flip-flop 223 further generates a second flip-flop signal at the second output terminal Q' to control the rectifier R. The NAND gate 224 has a first input terminal, a second input terminal and an output terminal. The first input terminal is electrically coupled to the timing circuit 231 to receive the timing signal TO. The second input terminal is electrically coupled to the over current detection circuit CMP2 to receive the over current detection signal OC. Based on the timing signal TO and the over current detection signal OC, the NAND gate 224 generates a NAND signal at the output terminal. The AND gate 225 has a first input terminal, a second input terminal and an output terminal. The first input terminal is electrically coupled to the second output terminal Q' of the RS flip-flop 223 to receive the second flip-flop signal, the second input terminal is electrically coupled to the NAND gate 224 to receive the NAND signal. Based on the second flip-flop signal and the NAND signal, the AND gate 225 generates an AND signal at the output terminal, which is provided to the control terminal of the rectifier R as a second control signal LS of the control circuit 202.

In the embodiment of FIG. 2, the off time period $t_{off}$ of the rectifier R varies inversely with the input voltage VIN. In one embodiment, the timing circuit 231 further has a second input terminal and a third input terminal which are configured to respectively receive the input voltage VIN and the output voltage VO. The timing signal TO is generated based on the input voltage VIN and the output voltage VO so that the off time $t_{off}$ is substantially inversely proportional to the difference between the input voltage VIN and the output voltage VO. That is, $$t_{off} = \frac{k1}{VIN - VO},$$

wherein k1 represents a scaling factor. In one embodiment, the scaling factor k1 is constant so as to get a constant peak-to-peak ripple current value Ipp irrelevant to the input voltage VIN or the output voltage VO with a given inductor L. While in another embodiment, the scaling factor k1 may vary along with the output voltage VO so as to make a trade-off between the peak-to-peak ripple current value Ipp and the switching frequency. That is, although the peak-to-peak ripple current value Ipp is not constant with a scaling factor k1 which varies along with the output voltage VO, it varies less than that with a fixed off time period as the output voltage VO varies, which is an improvement compared with the traditional approach. The other advantage of this technique is that the switching frequency of the switching converter varies less than that with a constant scaling factor k1, which is preferred by some customers in some situations. In another embodiment, the timing circuit 231 further has a second input terminal configured to receive the input voltage VIN. The timing signal TO is generated based on the input voltage VIN so that the off time $t_{off}$ is substantially inversely proportional to the input voltage VIN. That is, $$t_{off} = \frac{k2}{VIN},$$

wherein k2 represents another scaling factor which may be constant in one embodiment. In another embodiment, the scaling factor k2 may vary along with the output voltage VO so that the peak-to-peak ripple current value Ipp varies less than that with a fixed off time period as the output voltage VO varies.

FIG. 3 illustrates a timing circuit 300 which determines $$t_{off} = \frac{k1}{VIN - VO}$$

according to an embodiment of the present invention. The timing circuit 300 comprises a current generating circuit 301, a switch K, a capacitor C1 and a comparison circuit CMP4. The current generating circuit 301 comprises a first resistor R1, a second resistor R2, a third resistor R3, a fourth resistor R4, an amplifier AMP, a transistor T and a current mirror CM. It is noted that the labels of "R1", "R2", "R3" and "R4" each may indicate either a resistor or a resistance, the label of "C1" may indicate either a capacitor or a capacitance herein after. The first resistor R1 has a first terminal configured to receive the input voltage VIN and a second terminal electrically coupled to a first input terminal of the amplifier AMP. The second resistor R2 has a first terminal electrically coupled to the second terminal of the first resistor R1 and a second terminal electrically coupled to the reference ground. The third resistor R3 has a first terminal configured to receive the output voltage VO and a second terminal electrically coupled to a second input terminal of the amplifier AMP. The fourth resistor R4 has a first terminal electrically coupled to the second terminal of the third resistor R3 and a second terminal electrically coupled to the reference ground. In one embodiment, the first input terminal of the amplifier AMP is a non-inverting input terminal (+), and the second input terminal of the amplifier AMP is an inverting input terminal (−). The transistor T has a first terminal, a second terminal and a control terminal. The first terminal of the transistor T is electrically coupled to the first terminal of the fourth resistor R4, the second terminal of the transistor T is configured to provide a current, and the control terminal of the transistor T is electrically coupled to an output terminal of the amplifier AMP. The current mirror CM has a first terminal and a second terminal. The first terminal is electrically coupled to the second terminal of the transistor T to receive the current. As an intrinsic characteristic of a current mirror, the second terminal of the current mirror CM provides a current Ic that is substantially equal to the current received at the first terminal. The capacitor C1 has a first terminal electrically coupled to the second terminal of the current mirror CM and a second terminal coupled to the reference ground. The switch K has a first terminal electrically coupled to the first terminal of the capacitor C1, a second terminal electrically coupled to the second terminal of the capacitor C1, and a control terminal configured to receive the second control signal LS. The comparison circuit CMP4 has a non-inverting input terminal, an inverting input terminal and an output terminal. The non-inverting input terminal is electrically coupled to the first terminal of the capacitor C1, the inverting input terminal is configured to receive a reference signal VREF4. The comparison circuit CMP4 compares the voltage drop across the capacitor C1 with the reference signal VREF4 and generates a timing signal TO.

As intrinsic characteristics of an operational amplifier, the currents at the two input terminals of the amplifier AMP approximate to zero and the voltages at the two input terminals are substantially the same. Thus, by selecting resistors R1 and R3 with the same resistance and resistors R2 and R4 with the same resistance, the current Ic provided by the current mirror CM is as follows:

$$Ic = \frac{VIN - VO}{R1} \quad (2)$$

The off time period $t_{off}$ of the rectifier R thus can be expressed as:

$$t_{off} = \frac{C1 \times VREF4}{Ic} = \frac{C1 \times R1 \times VREF4}{VIN - VO} \quad (3)$$

Therefore, in the embodiment of FIG. 3, the off time period $$t_{off} = \frac{k1}{VIN - VO},$$

wherein the scaling factor k1 equals to the product of the capacitance C1, the resistance R1 and the reference signal VREF4.

Persons of ordinary skill in the art will recognize that in one embodiment, the reference signal VREF4 may be of constant value and the peak-to-peak ripple current value Ipp is constant irrelevant to the input voltage VIN or the output voltage VO in such embodiment. While in another embodiment, the reference signal VREF4 may be a function of the output voltage VO so as to make a trade-off between the peak-to-peak ripple current value Ipp and the switching frequency of the switching converter.

FIG. 4 illustrates the waveforms of the switching converter 200 implemented with the timing circuit 300 shown in FIG. 3. The operation of the switching converter 200 will be explained in detail with reference to FIG. 2 and FIG. 3. When the feedback signal VFB is lower than the over voltage threshold VREF1, the switching converter 200 is in normal operation and is out of the control of the over voltage protection circuit 203. More particularly, when the feedback signal VFB is below the over voltage threshold VREF1, the over voltage detection signal OV is logic low, the over current detection circuit CMP2 is thus disabled, providing a logic low over current detection signal OC, which further results in a low level timing signal TO. Accordingly, the NAND signal is logic high, allowing the switching circuit 201 being out of the control of the over voltage protection circuit 203. When the feedback signal VFB is detected being lower than the reference voltage VREF3, the RS flip-flop 223 is set by the comparator CMP3 to turn on the main switch M so as to increase the output voltage VO. After an on time period of the main switch M, the RS flip-flop 223 is reset by the on-time control circuit 221 to turn off the main switch M.

When the feedback signal VFB is higher than the over voltage threshold VREF1, the switching converter 200 enters into "dynamic regulation mode". In this mode, the over voltage detection signal OV is logic high, which enables the over current detection circuit CMP2. Thus, the over current detection circuit CMP2 detects the voltage drop VSEN across the on-resistor of the rectifier R and outputs a high level over current detection signal OC when the current sense signal VSEN reaches the over current threshold VREF2. The high level over current detection signal OC triggers the timing circuit 231 to output a high level timing signal TO. Since the timing signal TO and the over current detection signal OC are both high, the NAND gate 224 outputs a low level NAND signal to turn off the rectifier R through the AND gate 225. Meanwhile, the timing circuit 231 starts timing. After an off time period $t_{off}$, the timing signal TO become low, resulting in a high level NAND signal to turn on the rectifier R through the AND gate 225.

As shown in FIG. 4, at moment t1, the input voltage VIN decreases, resulting in a decreasing slope of the inductor current $i_L$ when the rectifier R is off. As the off time period $t_{off}$ is inversely proportional to the difference between the input voltage VIN and the output voltage VO, that is, $$t_{off} = \frac{C1 \times R1 \times VREF4}{VIN - VO},$$

the off time period $t_{off}$ increases accordingly. Thus, peak-to-peak ripple current value Ipp of the inductor current $i_L$ remains constant with the value below:

$$Ipp = \frac{VIN - VO}{L} \times \frac{C1 \times R1 \times VREF4}{VIN - VO} = \frac{C1 \times R1 \times VREF4}{L} \quad (4)$$

As can be seen from the above equation, with a given capacitor C1, resistor R1, inductor L and a reference signal VREF4, the peak-to-peak ripple current value Ipp of the inductor current $i_L$ is constant irrelevant to the input voltage VIN. And further, the peak-to-peak ripple current value Ipp is irrelevant to the output voltage VO with a constant reference signal VREF4. In the embodiment where the reference signal VREF4 varies along with the output voltage VO, the peak-to-peak ripple current value Ipp varies less than that with a fixed off time period as the output voltage VO varies.

FIG. 5 illustrates a timing circuit 500 which determines $$t_{off} = \frac{k2}{VIN}$$

according to another embodiment of the present invention. Compared with the timing circuit 300 illustrated in FIG. 3, the resistor R3 is omitted from the timing circuit. A similar analysis to that described for the timing circuit 300 can be carried out for the timing circuit 500, thus, the current provided by the current mirror CM in the timing circuit 500 is:

$$Ic = \frac{R2}{(R1 + R2) \times R4} \times VIN \quad (5)$$

The off time period $t_{off}$ of the rectifier R thus can be expressed as:

$$t_{off} = \frac{C1 \times VREF4}{Ic} = \quad (6)$$

$$\frac{C1 \times VREF4}{\frac{R2}{(R1 + R2) \times R4} \times VIN} = \frac{R4 \times (R1 + R2) \times C1 \times VREF4}{R2 \times VIN}$$

In one embodiment, the resistors R1, R2 and R4 and the capacitor C1 are appropriately chosen so that the switching frequency Fsw of the switching converter 200 can be expressed as follows:

$$Fsw = \frac{R2}{R4 \times (R1 + R2) \times C1} \quad (7)$$

In addition, the output voltage VO is chosen to be the reference signal VREF4. Thus, the off time $t_{off}$ of the rectifier R can be expressed as follows:

$$t_{off} = \frac{1}{Fsw} \times \frac{VO}{VIN} \quad (8)$$

As an example, the inductance of the inductor L and the output voltage VO are respectively chosen to be 200 nH and 3.3V for the calculation of the peak-to-peak ripple current value Ipp. In addition, the switching frequency Fsw is chosen to be 4 MHz for the Ipp calculation under the condition of equation (8) and the off time period $t_{off}$ is chosen to be 150 ns for the traditional approach for the purpose of comparison.

The peak-to-peak ripple current value Ipp for both the traditional approach and the approach described in the above embodiment are calculated when the input voltage VIN is chosen to be an integer within the range of 5~12 volt. For a better comparison, the calculation results are plotted in FIG. 6. As can be seen from FIG. 6, the peak-to-peak ripple current value Ipp varies less with the approach of the present invention than that with the traditional approach as the input voltage VIN varies.

FIG. 7 schematically illustrates a switching converter 700 in accordance with another embodiment of the present invention. Compared with the switching converter 200 of FIG. 2, a cycle counting circuit 734 and an AND gate 726 are further comprised in the switching converter 700. The cycle counting circuit 734 is electrically coupled to the output terminal of the over current detection circuit CMP2 to receive the over current detection signal OC, and the cycle counting circuit 734 generates a cycle counting signal SC based on the over current detection signal OC. The AND gate 726 has a first input terminal, a second input terminal and an output terminal, wherein the first input terminal is electrically coupled to the cycle counting circuit 734 to receive the cycle counting signal SC, and the second input terminal is electrically coupled to the first output terminal of the flip-flop 723 to receive the first flip-flop signal. Based on the cycle counting signal SC and the first flip-flop signal, the AND gate 726 generates an AND signal which is provided to the control terminal of the main switch M. The AND gate 723 further has a third input terminal electrically coupled to the cycle counting circuit 734 to receive the cycle counting circuit SC. Based on the second flip-flop signal, the NAND signal and the cycle counting signal, the AND gate 723 generate the AND signal at the output terminal.

The cycle counting circuit 734 starts counting cycles when the over current detection signal OC goes to high, and outputs a low level cycle counting signal SC when the cycles reaches a predetermined number. Such low level cycle counting signal SC overrides any value applied to the second input terminal of the AND gate 726 and to the first input terminal and the second input terminal of the AND gate 723, thus both the first control signal HS and the second control signal LS become logic low. Accordingly, both the main switch M and the rectifier R are turned off and the switching circuit 701 stops switching actions. In this way, the overcharge of the input voltage is prevented.

FIG. 8 schematically illustrates a switching converter 800 in accordance with another embodiment of the present invention. Compared with the switching converter 200 shown in FIG. 2, in the switching converter 800, the timing circuit 831 of the over voltage protection circuit 804 is reused as an on-time control circuit of the control circuit 802, of which the counterpart in the switching converter 200 is the on-time control circuit 221. That is, the control circuit 802 and the over voltage protection circuit 803 share a common timing circuit 831. The timing circuit 831 is configured to receive the control signal HS and to determine an off time period $t_{off}$ of the rectifier R (also referring to as an on time period of the main switch M) which varies inversely with the input voltage VIN. In one embodiment, the off time period $t_{off}$ of the rectifier R is substantially inversely proportional to the difference between the input voltage VIN and the output voltage VO. In another embodiment, the off time period $t_{off}$ of the rectifier R is inversely proportional to the input voltage VIN. Accordingly, the control circuit is adjusted for operation. The NAND gate 224 and the AND gate 225 in the switching converter 200 are replaced by an OR gate 822 which is electrically coupled to the comparison circuit 821 and the over current detection circuit CMP2 to respectively receive the comparison signal SET and the over current detection signal OC. Based on the comparison signal SET and the over current detection signal OC, the OR gate 822 generates an OR signal. The set terminal S of the RS flip-flop 823 is electrically coupled to the OR gate 822 to receive the OR signal. Based on the OR signal and the on-time control signal CO, the RS flip-flop 823 generates control signals HS and LS to respectively control the main switch M and the rectifier R.

FIG. 9 illustrates the waveforms of the switching converter 800 shown in FIG. 8. The operation of the switching converter 800 will be explained below with reference to FIG. 8 and FIG. 9. In the switching converter 800, either the comparison signal SET or the over current detection signal OC sets the RS flip-flop 823 so as to provide two complementary control signals HS and LS to respectively turn on the main switch M and to turn off the rectifier R simultaneously through the OR gate 822. In dynamic regulation mode, when the rectifier R is turned off and the main switch M is turned on, the inductor current $i_L$ flows from the output terminal of the switching circuit 801 to the input terminal through the closed main switch M and increases gradually. Meanwhile, the timing circuit 831 is triggered by the control signal HS and begins timing. After the time period determined by the timing circuit 831, the main switch M is turned off and the rectifier R is turned on. The inductor current $i_L$ flows from the output terminal of the switching circuit 801 to the reference ground through the closed rectifier R and decreases gradually. With a tight control, the inductor current $i_L$ will remain negative as shown in FIG. 8 during the entire time the main switch M is on so that the voltage drop of VIN-VO is used to reduce the magnitude of the negative current in the inductor, and meanwhile the inductor current $i_L$ will not increase the output voltage VO. As a result, the high output voltage VO is brought back into normal level. Since the off time $t_{off}$ of the rectifier R varies inversely with the input voltage VIN, and the rising slope of the inductor current $i_L$ varies along with the input voltage VIN when the rectifier R is turned off, the peak to peak ripple current value Ipp of the inductor current iL varies less with the input voltage VIN than that of the traditional approach. Thus, an improved accuracy is achieved with the new technique provided by the present invention. Besides, as the control circuit 802 and the over voltage protection circuit 803 share a common timing circuit, the size of the circuit would be smaller and the switching converter 800 provides a compact solution. Since the main switch M is turned on during the off time of the rectifier R, the inductor current $i_L$ flows through the turned-on main switch M rather than its body diode, an injected substrate current is eliminated and the power dissipation is suppressed.

Persons of ordinary skill in the art will recognize that, for the convenience of description, the reused timing circuit 831 is shown to be comprised in the over voltage protection circuit 803 rather than in the control circuit 802 in the embodiment illustrated in FIG. 8, however, it is essentially the same that the reused timing circuit is shown as being comprised in the control circuit 802 rather than the over voltage protection circuit 803.

FIG. 10 schematically illustrates an over voltage protection circuit 1000 in accordance with another embodiment of the present invention. Compared with the over voltage protection circuit 203 shown in FIG. 2, the over voltage protection circuit 1000 further comprises an AND gate 1035 having a first input terminal, a second input terminal and an output terminal. The first input terminal is electrically coupled to the over voltage detection circuit CMP1 to receive the over voltage detection signal OV, the second input terminal is electrically coupled to the over current detection circuit CMP2 to receive the over current detection signal OC. Based on the over voltage detection signal OV and the over current detection signal OC, the AND gate 1035 generates an AND signal. The timing circuit 1031 is electrically coupled to the AND gate 1035 to receive the AND signal and therefore generates the timing signal TO. In the embodiment illustrated in FIG. 10, the over current detection circuit CMP2 is shielded by the over voltage detection signal OV when the feedback signal VFB is higher than the over voltage threshold VREF1.

FIG. 11 illustrates an over voltage protection method 1100 for a switching converter in accordance with an embodiment of the present invention. The switching converter comprises a main switch and a rectifier and is configured to provide a regulated output voltage VO based on an input voltage VIN. As shown in FIG. 11, the over voltage protection method 1100 comprises steps 1101~1105. In step 1101, the method 1100 detects whether the output voltage VO is higher than a predetermined value. If no, the method 1100 terminates in step 1105; otherwise, the method 1100 proceeds to step 1102 to turn on the rectifier. Step 1103 is then performed to detect whether a current flowing through the rectifier is lower than a negative current limit. If no, the method 1100 stays in step 1102 to keep the rectifier on; otherwise, the method 1100 proceeds to step 1104, in which the rectifier is turned off for a time period which varies inversely with the input voltage VIN. Subsequently, step 1101 is performed again.

In one embodiment, step 1101 of the over voltage protection method 1100 may comprise comparing a feedback signal representative of the output voltage VO with an over voltage threshold. In another embodiment, step 1103 may comprise comparing a current sense signal representative of the current flowing through the rectifier with an over current threshold.

In other embodiments, the over voltage protection method 1100 further comprises turning on the main switch during the off time period of the rectifier. In opposite, the over voltage protection method 1100 may further comprise turning off the main switch during the off time period of the rectifier.

In the embodiment illustrated in FIG. 11, steps 1106~1108 are additionally comprised in the over voltage protection method 1100 to limit the switching cycles of the rectifier. When the output voltage VO is detected higher than the predetermined value, step 1106 is performed to start counting the switching cycles of the rectifier. Subsequently, in step 1107, the method 1100 detects whether the switching cycles of the rectifier reaches a predetermined number. If no, the method 1100 jumps back to step 1106; otherwise, the method goes to step 1108 to shut off the switching converter. The approach illustrated in steps 1106~1108 limits the amount of energy that can be transferred from the output voltage VO to the input voltage VIN and the input voltage VIN is prevented from over-charge. Persons of ordinary skill in the art will recognize that in the embodiment illustrated in FIG. 11, steps 1106~1108 of the over voltage protection method 1100 are illustrative and may be omitted in some other embodiments.

It will be appreciated by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

I claim:

1. A controller for controlling a switching circuit, wherein the switching circuit comprises a rectifier, and the switching circuit is configured to provide an output voltage based on an input voltage, the controller comprises:
   an over voltage protection circuit comprising:
      an over voltage detection circuit configured to compare a feedback signal representative of the output voltage with an over voltage threshold and to generate an over voltage detection signal based on a comparison result of comparing the feedback signal with the over voltage threshold;
      an over current detection circuit configured to compare a current sense signal representative of a current flowing through the rectifier with an over current threshold and to generate an over current detection signal based on a comparison result of comparing the current sense signal with the over current threshold; and
      a timing circuit configured to generate a timing signal based on the over voltage detection signal and the over current detection signal, wherein the timing signal is configured to control an off time of the rectifier so that the off time varies inversely with the input voltage; and
   a control circuit electrically coupled to the over voltage protection circuit and the switching circuit, wherein based on the over current detection signal, the timing signal and the feedback signal, the control circuit generates a control signal to control the rectifier.

2. The controller of claim 1, wherein the off time of the rectifier is inversely proportional to the input voltage.

3. The controller of claim 1, wherein the off time of the rectifier is substantially inversely proportional to the difference between the input voltage and the output voltage.

4. The controller of claim 1, wherein the over voltage protection circuit further comprises a time limiting circuit configured to shut off the switching converter at an end of a predetermined time period starting from a moment when the output voltage exceeds an over output voltage.

5. The controller of claim 1, wherein the over current detection circuit is electrically coupled to the over voltage detection circuit to receive the over voltage detection signal and is configured to generate the over current detection signal based thereupon, and wherein the timing circuit is electrically coupled to the over current detection circuit to receive the over current detection signal and is configured to generate the timing signal based thereupon.

6. The controller of claim 1, wherein the over voltage detection circuit is further configured to compare the feedback signal with an exit reference voltage, and the over voltage detection signal transits from a first state to a second state when the feedback signal is higher than the over voltage threshold and from the second state to the first state when the feedback signal is lower than the exit reference voltage.

7. The controller of claim 1, wherein the control circuit comprises:
   an on-time control circuit configured to provide an on-time control signal;
   a comparison circuit configured to compare the feedback signal with a reference signal and to generate a comparison signal based on a comparison result of comparing the feedback signal with the reference signal;
   a flip-flop electrically coupled to the on-time control circuit and the comparison circuit, wherein based on the on-time control signal and the comparison signal, the flip-flop is configured to provide a first flip-flop signal and a second flip-flop signal;

a NAND gate electrically coupled to the over current detection circuit and the timing circuit, wherein based on the over current detection signal and the timing signal, the NAND gate is configured to generate a NAND signal; and a first AND gate electrically coupled to the NAND gate and the flip-flop, wherein based on the NAND signal and the second flip-flop signal, the first AND gate is configured to generate the control signal to control the rectifier.

8. The controller of claim 7, wherein the over voltage protection circuit further comprises a cycle counting circuit electrically coupled to the over current detection circuit, and the cycle counting circuit is configured to generate a cycle counting signal based on the over current detection signal, and wherein the control circuit further comprises a second AND gate electrically coupled to the cycle counting circuit and the flip-flop, and the second AND gate is configured to generate a first control signal based on the first flip-flop signal and the cycle counting signal, and wherein the first AND gate is further electrically coupled to the cycle counting circuit, and the first AND gate is configured to generate a second control signal based on the cycle counting signal, the NAND signal and the second flip-flop signal.

9. The controller of claim 1, wherein the control circuit comprises:
a comparison circuit configured to compare the feedback signal with a reference signal and to generate a comparison signal based on a comparison result of comparing the feedback signal with the reference signal;
an OR gate electrically coupled to the comparison circuit and the over current detection circuit, wherein the OR gate is configured to generate an OR signal based on the over current detection signal and the comparison signal; and
a flip-flop electrically coupled to the timing circuit and the OR gate, wherein the flip-flop is configured to provide the control signal based on the timing signal and the OR signal.

10. A switching converter, comprising:
a switching circuit comprising a rectifier, wherein the switching circuit is configured to provide an output voltage based on an input voltage; and
a controller comprising:
an over voltage detection circuit configured to compare a feedback signal representative of the output voltage with an over voltage threshold and to generate an over voltage detection signal based on a comparison result of comparing the feedback signal with the over voltage threshold;
an over current detection circuit configured to compare a current sense signal representative of a current flowing through the rectifier with an over current threshold and to generate an over current detection signal based on a comparison result of comparing the current sense signal with the over current threshold;
a timing circuit configured to generate a timing signal based on the over voltage detection signal and the over current detection signal, wherein the timing signal is configured to control an off time of the rectifier so that the off time varies inversely with the input voltage; and
a control circuit electrically coupled to the over voltage protection circuit and the switching circuit, wherein based on the over current detection signal, the timing signal and the feedback signal, the control circuit generates a control signal to control the rectifier.

11. The switching converter of claim 10, wherein the off time of the rectifier is inversely proportional to the input voltage.

12. The switching converter of claim 10, wherein the off time of the rectifier is substantially inversely proportional to the difference between the input voltage and the output voltage.

13. The switching converter of claim 10, wherein the over voltage protection circuit further comprises a time limiting circuit configured to disable the switching converter at an end of a predetermined time period starting from a moment when the output voltage exceeds an over output voltage.

14. The switching converter of claim 10, wherein the over current detection circuit is electrically coupled to the over voltage detection circuit to receive the over voltage detection signal and is configured to generate the over current detection signal based thereupon, and wherein the timing circuit is electrically coupled to the over current detection circuit to receive the over current detection signal and is configured to generate the timing signal based thereupon.

15. The switching converter of claim 10, wherein the control circuit comprises:
an on-time control circuit configured to provide an on-time control signal;
a comparison circuit configured to compare the feedback signal with a reference signal and to generate a comparison signal based on a comparison result of comparing the feedback signal with the reference signal;
a flip-flop electrically coupled to the on-time control circuit and the comparison circuit, wherein based on the on-time control signal and the comparison signal, the flip-flop is configured to provide a flip-flop signal;
a NAND gate electrically coupled to the over current detection circuit and the timing circuit, wherein based on the over current detection signal and the timing signal, the NAND gate is configured to generate a NAND signal; and
a first AND gate electrically coupled to the NAND gate and the flip-flop, wherein based on the NAND signal and the second flip-flop signal, the first AND gate is configured to generate the control signal to control the rectifier.

16. The switching converter of claim 10, wherein the control circuit comprises:
a comparison circuit configured to compare the feedback signal with a reference signal and to generate a comparison signal based on a comparison result of comparing the feedback signal with the reference signal;
an OR gate electrically coupled to the comparison circuit and the over current detection circuit, wherein the OR gate is configured to generate an OR signal based on the over current detection signal and the comparison signal; and
a flip-flop electrically coupled to the timing circuit and the OR gate, wherein the flip-flop is configured to provide the control signal based on the timing signal and the OR signal.

17. An over voltage protection method for a switching converter comprising a rectifier, wherein the switching converter is configured to provide an output voltage based on an input voltage, the over voltage protection method comprises:
detecting whether the output voltage is higher than a predetermined value;
turning on the rectifier when the output voltage is higher than the predetermined value;

detecting whether a current flowing through the rectifier is lower than a negative current limit;

turning off the rectifier for a time period when the current flowing through the rectifier is lower than the negative current limit; and wherein the time period varies inversely with the input voltage.

18. The over voltage protection method of claim 17, wherein the off time of the rectifier is inversely proportional to the input voltage.

19. The over voltage protection method of claim 17, wherein the off time of the rectifier is substantially inversely proportional to the difference between the input voltage and the output voltage.

20. The over voltage protection method of claim 17, wherein the over voltage protection method further comprises shutting off the switching converter at an end of a predetermined time period starting from a moment when the output voltage exceeds an over output voltage.

* * * * *